United States Patent
Robertson et al.

(10) Patent No.: US 8,463,867 B2
(45) Date of Patent: Jun. 11, 2013

(54) DISTRIBUTED STORAGE NETWORK

(75) Inventors: Derrick D Robertson, Woodbridge (GB); Paul F Mckee, Colchester (GB)

(73) Assignee: British Telecommunications plc, London (GB)

( * ) Notice: Subject to any disclaimer, the term of this patent is extended or adjusted under 35 U.S.C. 154(b) by 1072 days.

(21) Appl. No.: 10/541,061

(22) PCT Filed: Dec. 31, 2003

(86) PCT No.: PCT/GB03/05699
§ 371 (c)(1),
(2), (4) Date: Jun. 29, 2005

(87) PCT Pub. No.: WO2004/059533
PCT Pub. Date: Jul. 15, 2004

(65) Prior Publication Data
US 2006/0117046 A1    Jun. 1, 2006

(30) Foreign Application Priority Data

Dec. 31, 2002 (GB) .................................. 0230331.1
Sep. 30, 2003 (GB) .................................. 0322862.4

(51) Int. Cl.
*G06F 15/167* (2006.01)
(52) U.S. Cl.
USPC .......... 709/216; 709/224; 709/231; 711/141; 370/428
(58) Field of Classification Search
USPC ....................................................... 709/216
See application file for complete search history.

(56) References Cited

U.S. PATENT DOCUMENTS

| | | | | |
|---|---|---|---|---|
| 5,423,037 | A | * | 6/1995 | Hvasshovd .................. 707/202 |
| 5,442,791 | A | | 8/1995 | Wrabetz |
| 5,732,397 | A | | 3/1998 | Detore |
| 5,745,687 | A | | 4/1998 | Randell |
| 5,774,668 | A | | 6/1998 | Choquier et al. |
| 5,790,848 | A | * | 8/1998 | Wlaschin ..................... 707/201 |
| 5,829,023 | A | | 10/1998 | Bishop |
| 5,881,231 | A | | 3/1999 | Takagi et al. |
| 5,978,791 | A | | 11/1999 | Farber |
| 6,128,590 | A | * | 10/2000 | Stadel et al. .................... 703/27 |
| 6,249,844 | B1 | | 6/2001 | Schloss |

(Continued)

FOREIGN PATENT DOCUMENTS

| | | |
|---|---|---|
| EP | 0 481 231 | 9/1991 |
| EP | 0 515 073 | 11/1992 |

(Continued)

OTHER PUBLICATIONS

Sean Rhea, Chris Wells, Patrick Eaton, Dennis Geels, Ben Zhao, Hakim Weatherspoon, and John Kubiatowicz, "Maintenance-Free Global Data Storage", Sep. Oct. 2001, IEEE Internet Computing, http://computer.org/internet/, 1089-7801/01, all pages.*

(Continued)

*Primary Examiner* — Hua Fan
(74) *Attorney, Agent, or Firm* — Nixon & Vanderhye PC

(57) ABSTRACT

A determination as to whether to store a data item at a computer connected to a distributed storage network of computers is made in dependence on a policy document associated with that data item. The policy document is constructed in accordance with a Document Type Definition expressed in extensible Markup Language (XML). This provides a more flexible method of system managed storage.

20 Claims, 14 Drawing Sheets

U.S. PATENT DOCUMENTS

| | | | |
|---|---|---|---|
| 6,272,612 B1 | 8/2001 | Bordaz | |
| 6,330,621 B1* | 12/2001 | Bakke et al. | 710/5 |
| 6,336,177 B1 | 1/2002 | Stevens | |
| 6,353,608 B1 | 3/2002 | Cullers et al. | |
| 6,393,485 B1 | 5/2002 | Chao et al. | |
| 6,405,284 B1 | 6/2002 | Bridge | |
| 6,438,705 B1 | 8/2002 | Chao et al. | |
| 6,463,457 B1 | 10/2002 | Armentrout et al. | |
| 6,505,283 B1 | 1/2003 | Stoney | |
| 6,605,286 B2 | 8/2003 | Steidler | |
| 6,622,221 B1 | 9/2003 | Zahavi | |
| 6,631,449 B1* | 10/2003 | Borrill | 711/141 |
| 6,662,235 B1* | 12/2003 | Callis et al. | 719/318 |
| 6,801,949 B1 | 10/2004 | Bruck et al. | |
| 6,871,219 B2 | 3/2005 | Noordergraaf | |
| 6,898,634 B2 | 5/2005 | Collins | |
| 6,961,539 B2 | 11/2005 | Schweinhart et al. | |
| 7,062,556 B1 | 6/2006 | Chen et al. | |
| 7,069,295 B2* | 6/2006 | Sutherland et al. | 709/203 |
| 7,127,606 B2 | 10/2006 | Wheeler et al. | |
| 7,152,077 B2 | 12/2006 | Veitch et al. | |
| 7,296,221 B1 | 11/2007 | Treibach-Heck et al. | |
| 7,434,257 B2 | 10/2008 | Garg et al. | |
| 7,610,333 B2 | 10/2009 | Robertson et al. | |
| 2001/0034709 A1 | 10/2001 | Stoifo et al. | |
| 2001/0034791 A1 | 10/2001 | Clubb et al. | |
| 2002/0002577 A1 | 1/2002 | Garg et al. | |
| 2002/0082048 A1* | 6/2002 | Toyoshima | 455/557 |
| 2002/0099815 A1* | 7/2002 | Chatterjee et al. | 709/224 |
| 2002/0114341 A1* | 8/2002 | Sutherland et al. | 370/428 |
| 2002/0124134 A1* | 9/2002 | Chilton | 711/113 |
| 2002/0129248 A1 | 9/2002 | Wheeler et al. | |
| 2002/0133681 A1 | 9/2002 | McBrearty et al. | |
| 2002/0138471 A1 | 9/2002 | Dutta et al. | |
| 2002/0138659 A1 | 9/2002 | Trabaris et al. | |
| 2002/0156893 A1 | 10/2002 | Pouyoul et al. | |
| 2002/0184310 A1 | 12/2002 | Traversat et al. | |
| 2003/0032391 A1 | 2/2003 | Schweinhart et al. | |
| 2003/0046270 A1 | 3/2003 | Leung et al. | |
| 2003/0061491 A1* | 3/2003 | Jaskiewicz et al. | 713/182 |
| 2003/0115251 A1 | 6/2003 | Fredrickson et al. | |
| 2003/0163457 A1 | 8/2003 | Yano et al. | |
| 2003/0204856 A1 | 10/2003 | Buxton | |
| 2004/0054807 A1 | 3/2004 | Harvey et al. | |
| 2004/0064568 A1 | 4/2004 | Arora et al. | |
| 2005/0022014 A1 | 1/2005 | Shipman | |
| 2005/0050291 A1 | 3/2005 | Chen et al. | |
| 2005/0257220 A1 | 11/2005 | McKee | |
| 2006/0149836 A1 | 7/2006 | Robertson et al. | |
| 2008/0059746 A1 | 3/2008 | Fisher | |

FOREIGN PATENT DOCUMENTS

| | | |
|---|---|---|
| EP | 0 750 256 | 6/1996 |
| EP | 0 887 731 | 6/1998 |
| EP | 1248441 | 10/2002 |
| JP | 2002-027375 A | 1/2002 |
| WO | 96/30839 | 10/1996 |
| WO | 98/09402 | 3/1998 |
| WO | 99/44334 | 9/1999 |
| WO | 01/82678 | 11/2001 |
| WO | 02/29551 A3 | 4/2002 |
| WO | 03/069480 A1 | 8/2003 |
| WO | 2004/001598 A2 | 12/2003 |
| WO | 2005/121965 | 12/2005 |

OTHER PUBLICATIONS

Robertson, et al., "Persistent, Reliable, Decentralised File System—DFS," XP-002302658, 4 pages, Sep. 2002.

Devarakonda, et al., "A Policy-Based Storage Management Framework," *IEEE Proceedings of the Third International Workshop on Policies for Distributed Systems and Networks (POLICY'02)*, 4 pages, Apr. 2002.

Devarakonda, et al., "A Toolkit-Based Approach to Policy-Managed Storage," pp. 89-92, Apr. 2003.

Marrow, et al., "Agents in Decentralised Information Ecosystems: The Diet Approach," 9 pages.

Hoile, et al., "Core Specification and Experiments in Diet: A Decentralised Ecosystem-inspired Mobile Agent System," *AAMAS'02*, pp. 623-630, Jul. 2002.

Rabin, "Efficient Dispersal of Information for Security, Load Balancing, and Fault Tolerance," *J. Assn. Comp. Mach.*, vol. 35, No. 2, pp. 335-348, Apr. 1989.

Verma, et al., "Policy based Management of Content Distribution Networks," pp. 1-7.

Fisher, et al., "Policy Based Management of Large Distributed Systems," 4 pages, Oct. 2001.

Prnjat, et al., "Policy-based Management for ALAN-Enabled Networks," 12 pages, Jun. 2002.

Carlson, et al., "Policy-based Storage Management," Storage Networking Industry Association (SNIA), pp. 1-10, Aug. 2000.

Weatherspoon, et al., "Silverback: A Global-Scale Archival System," XP-002302722, pp. 1-15, Mar. 2001.

Gelb, "System-managed storage," *IBM Systems Journal*, vol. 28, No. 1, pp. 77-103, 1989.

International Search Report dated Nov. 2, 2004, re PCT/GB03/05396.

UK Search Report dated Jun. 18, 2003, re GB 0230331.1.

Smithson, et al., "Engineering an Agent-Based Peer-to-Peer Resource Discovery System," Agents and Peer-to-Peer Computing, First International Workshop, AP2PC 2002, Revised and Invited Paper (Lecture Notes in Artificial Intelligence, vol. 2530), Springer-Verlag, Berlin, Germany, pp. 69-80, Jul. 2002.

Ramanathan, et al., "Finding Good Peers in Peer-to-Peer Networks," Parallel and Distributed Processing Symposium, Proceedings International, IPDPS 2002, Abstracts and CD-ROM, Ft. Lauderdale, FL, Apr. 2002, Los Alamitos, CA, IEEE Comp. Soc. 8US, pp. 232-239, Apr. 2002.

Rowstron, et al., "Storage Management and Caching in PAST, a Large-Scale, Persistent Peer-to-Peer Storage Utility," Operating Systems Review ACM, USA, vol. 35, No. 5, pp. 188-201, Oct. 2001.

Office Action in U.S. Appl. No. 10/539,413 mailed Apr. 1, 2008.

Office Action in U.S. Appl. No. 10/539,413 mailed Sep. 18, 2007.

U.S. Appl. No. 11/628,612, filed Dec. 6, 2006, Fisher.

Office Action mailed Jul. 2, 2009 in U.S. Appl. No. 11/628,612.

Office Action mailed Nov. 10, 2009 in U.S. Appl. No. 10/517,434.

Office Action mailed Jan. 14, 2009 in U.S. Appl. No. 10/517,434.

Notice of Allowance mailed Jun. 16, 2009 in U.S. Appl. No. 10/539,413.

Office communication mailed Jun. 10, 2009 in U.S. Appl. No. 10/539,413.

Notice of Allowance mailed May 12, 2009 in U.S. Appl. No. 10/539,413.

Decision Granting Petition Under 37 CFR 1.313(c)(2) mailed Apr. 23, 2009 in U.S. Appl. No. 10/539,413.

Office communication mailed Feb. 23, 2009 in U.S. Appl. No. 10/539,413.

Notice of Drawing Inconsistency with Specification mailed Feb. 5, 2009 in U.S. Appl. No. 10/539,413.

Notice of Allowance mailed Dec. 31, 2008 in U.S. Appl. No. 10/539,413.

Office communication mailed Jul. 18, 2008 in U.S. Appl. No. 10/539,413.

Bindel, David et al., "OceanStore: An Extremely Wide-Area Storage System," Mar. 1999, U.C. Berkeley, Technical Report, UCB/CSD-00-1102.

Rhea, Sean et al., "Pond: The OceanStore Prototype," Mar. 2003, USENIX, Fast '03.

Lim, et al., "Developing pattern-based management programs", CTR Technical Report 503-01-01, Aug. 6, 2001, pp. 1-19.

Plaszczak, "Hydra: Decentralized Distributed Computing Environment. System Design and Prototype Implementation", University of Mining and Metallurgy in Krakow, Poland, Jul. 2000, pp. 1-93.

"Optimizing File Storage Performance with Adaptive Resource Networking", Acopia Networks, Inc., pp. 1-7, 2003.

Tang, et al., "Sorrento: A Self-Organizing Storage Cluster for Parallel Data-Intensive Application", UCSB Technical ReportID:2003-30, pp. 1-14, Oct. 2003.

Collins, et al., "A Network File Storage System", Los Alamos National Laboratory, pp. 99-101, 1982.

Foster, et al., "Renaissance: Managing the Network Computer and its Storage Requirements", Epoch Systems, Inc., pp. 3-10, 1991.

McClain, "DataTree and UniTree: Software for File and Storage Management", Distributed Computing Solutions, pp. 126-128, 1990.

Thanhardt, et al., "File Migration in the Ncar Mass Storage System", National Center for Atmospheric Research, pp. 114-121, 1988.

Mecozzi, et al., "Design for a Transparent, Distributed File System", Lawrence Livermore National Laboratory, pp. 77-84, 1991.

Liu, et al., "An Effective File Migration Algorithm in Cluster File Systems", Department of Computer Science and Technology, pp. 329-335, 2000.

Chen, et al., "JVM for a Heterogeneous Shared Memory System", Computer Science Department, pp. 1-10.

Shu, et al., "Policy of File Migration at Server in Cluster File System", Computer Science and Technology Department, 8 pages.

"Adaptive Resource Networking", Acopia Networks—Adaptive Resource Networking, http://www.acopia.com/adaotive_networking/index.shtml, 3 pages Feb. 12, 2004.

UK Search Report dated Oct. 15, 2004.

International Search Report dated Dec. 23, 2005.

Office Action mailed Mar. 1, 2010 in U.S. Appl. No. 11/628,612.

Office Action mailed Sep. 2, 2010 in U.S. Appl. No. 11/628,612.

Dennis Geels and John Kubiatowicz, "OIL: the OceanStore Introspection Layer." Jan. 2002. http://oceanstore.cs.berkeley.edu/publications/talks/tahoe-2002-01/oil.pdf.

Kevin Johnson, Internet Email Protocols—A Developer's Guide, Chapter 3, Mail Transport, 4 pages (Oct. 1999).

J. Klensin, et al., SMTP Service Extension for Message Size Declaration, pp. 1-9 (Nov. 1995).

\* cited by examiner

DISTRIBUTED STORAGE NETWORK

This application is the US national phase of international application PCT/GB2003/005699 filed 31 Dec. 2003 which designated the U.S. and claims benefit of GB 0230331.1, dated 31 Dec. 2002 and GB 0322862.4, dated 30 Sep. 2003, the entire content of which is hereby incorporated by reference.

BACKGROUND

1. Technical Field

The present invention relates to a distributed storage network.

2. Related Art

A single computer may have many different types of memory (so-called volatile memory on the processor chip, in cache memory close to the chip, in Random Access Memory (RAM) connected to the processor via the system bus, or non-volatile memory—for example, a hard disk). When a user saves a file, it is recorded on non-volatile memory.

The advent of computer networking has led to the possibility of recording a file created using one computer in a non-volatile memory controlled by another computer. The most common example of this is a Local Area Network (LAN) which has a number of PCs and a file server connected to it. In that case, a user generating a file using one of the PCs can choose (using a Graphical User Interface) whether to store the file on the hard disk of the PC or on non-volatile memory on the file server. Normally, the non-volatile memory of the file server is provided by a Redundant Array of Inexpensive Disks which generates a number of fragments of the file, adding redundant information in the process, and stores the fragments on different disks. The redundancy means that access to one or more of the disks can fail without preventing users from retrieving files they have previously stored on the file server.

A paper entitled "System-Managed Storage", by J. Gelb, in the IBM Systems Journal; 1989; 28, 1; p77, proposes the use of software to overcome problems caused by users having control over where in the network data is placed. Instead of relying on a user to choose a memory device for storing his data, a user indicates a desired characteristic of the storage— e.g. "STORCLAS=CRITICAL" and a computer process determines a suitable memory device for storing the file. The system administrator provides mapping data matching storage devices to desired characteristics of storage. That mapping data is used by a storage management program to select a physical device for storing a file on the basis of the desired characteristic(s) of storage provided by the user.

International Patent application WO 03/025756 discloses a similar system. Rather than specify the attributes of the storage required each time a file is saved, a storage policy can be set which specifies the attributes required for storage anywhere in the entire network, or which might specify the attributes for a subset of the devices making up the network.

International Patent application WO 03/069480 discloses a storage system comprising a main file server and a plurality of cache servers. When a client requests to store a file, various characteristics of the contents of the file (e.g. degree of popularity, degree of urgency etc.), are used in order to look up a pre-specified policy. Where to store that file is then decided on the basis of the pre-specified policy—that decision depending on a pathname to the file to be stored.

Japanese patent application 2002-027375 discloses a programme distribution system which comprises a programme server, a programme management server, a plurality of set-top boxes—each containing a hard disk for storing programmes, a wireless broadcast network connecting the programme server to the set-top boxes, and a wired network connecting the set-top boxes to the programme management server and also providing a connection between the two servers. An owner of a set-top box can elect to store a programme (e.g. an advertisement) in return for a discount to the invoice levied by the programme service provider. Attributes describing aspects of the program are sent to the set-top box by the programme management server and stored in a storage information database in the set-top box. The stored attributes include the name of the program and an indication of a partition of the hard-disk where the programme is to be stored. When the programme is actually broadcast by the programme server, attributes describing the programme are transmitted with it. Included within the broadcast attributes are the name of the programme and its size. When the set-top box finds that the programme name matches a programme stored in the storage information database, a storage control unit is activated to decide whether the program is stored on the hard-disk contained within the set-top box. That decision depends on whether the size of the programme is greater than the remaining capacity of the partition on the disk allocated to the programme. It appears that the decision is a step in the software program which controls the operation of the set-top box.

BRIEF SUMMARY

According to a first aspect of the present invention, there is provided a distributed storage network comprising a plurality of interconnected computers, said computers including a plurality of host computers and at least one client computer, wherein said client computer stores client code comprising:

a) storage initiation code executable to initiate storage of a data item on one or more of said plurality of host computers;

b) storage condition generation code executable to generate one or more interpretable storage conditions indicating characteristics of host computers suitable for storing said data item;

wherein each of said host computers stores host code including:

c) host computer characteristic provision code executable to provide host characteristic data indicating one or more characteristics of said host computer;

wherein at least one of said interconnected computers has:

d) condition interpreter code executable to interpret said one or more interpretable storage conditions in the light of said one or more host characteristics provided by said host computer and thereby to establish whether said host computer meets said storage conditions;

said host code further comprising:

e) data item storage code executable to store said data item in said host computer on the execution of said condition interpreter code finding that said host computer meets said requirements.

By providing for the generation of interpretable storage conditions for storage of a file or file fragment, which conditions indicate the required characteristics of any host computer which might store the file or file fragment, and, on the initiation of storage of a data item, extracting actual characteristics of a candidate host computer for storage of the file or file fragment, executing condition evaluation code to establish whether the characteristics of the candidate host computer meet the requirements set out in the interpretable storage conditions, and then storing the file or file fragment at the host computer should those conditions be met, a more flexible form of system-managed storage than has hitherto existed is provided.

In preferred embodiments, said storage initiation code causes the execution of said storage condition generation code, said storage initiation code further sending said storage condition with said data item to one or more of said host computers. Such embodiments provide an implicit binding between the data item and the storage conditions for that data item. This obviates the need for separate data recording such bindings, and thus saves on memory, and also on the bandwidth of requests for binding information made to any device which might otherwise be required to store the binding data.

It is possible for the various items of code mentioned above to be additionally present in other computers. For example, the condition interpreter code could be present in each of the client computers, enabling the decision as whether to store a file or file fragment to be made locally (thereby saving on bandwidth). In one form of distributed storage network, each computer has both client code and host code, and thus can initiate storage of a data item on other computers, and store data items for other computers (and itself). This arrangement is more flexible than having some computer execute only client code or host code.

Preferably, said one or more interpretable storage conditions are persistently stored at one or more of said computers. This allows the storage condition to be saved once and applied to a number of data items. This saves on storage space (for the storage conditions), and bandwidth in the network interconnecting the computers.

In preferred embodiments, one or more computers further stores condition editor code executable to provide a user with an interface enabling the user to update said interpretable storage conditions or to record new interpretable storage conditions. This provides the user with a straightforward method of customising the policy applied when choosing where to store a file. Thus, the user is provided with an interface by which he can adjust the storage of a file, or fragments of a file, in order to provide storage arrangements having different advantages. For example, the storage conditions might dictate that different fragments of the same file are stored at different nodes (offering good resilience if not all fragments are required in order to re-create the file). Alternatively, the storage condition might dictate that the file should be stored with files relating to predetermined subject matter—this would be useful in providing targeted advertising to people who store video programmes on their set-top boxes, for example. A different set of storage conditions could implement a policy which places files or file fragments at computers that can communicate with the client computer in less than a predefined time.

Where a client computer does execute condition interpreter code, it might additionally execute forwarding code executable, on the execution of said condition interpreter code finding that the host computer does not meet said conditions, to forward said data item and said storage condition to another of said host computers. In this way, the decision as to where to store a file or file fragment is made without requiring a central computer to determine on which of the client computer(s) the file or file fragment is to be stored.

BRIEF DESCRIPTION OF THE DRAWINGS

In order that the present invention may be better understood, embodiments thereof will now be described, by way of example only, with reference to the accompanying drawings in which.

DETAILED DESCRIPTION OF EXEMPLARY EMBODIMENTS

Figure 1:
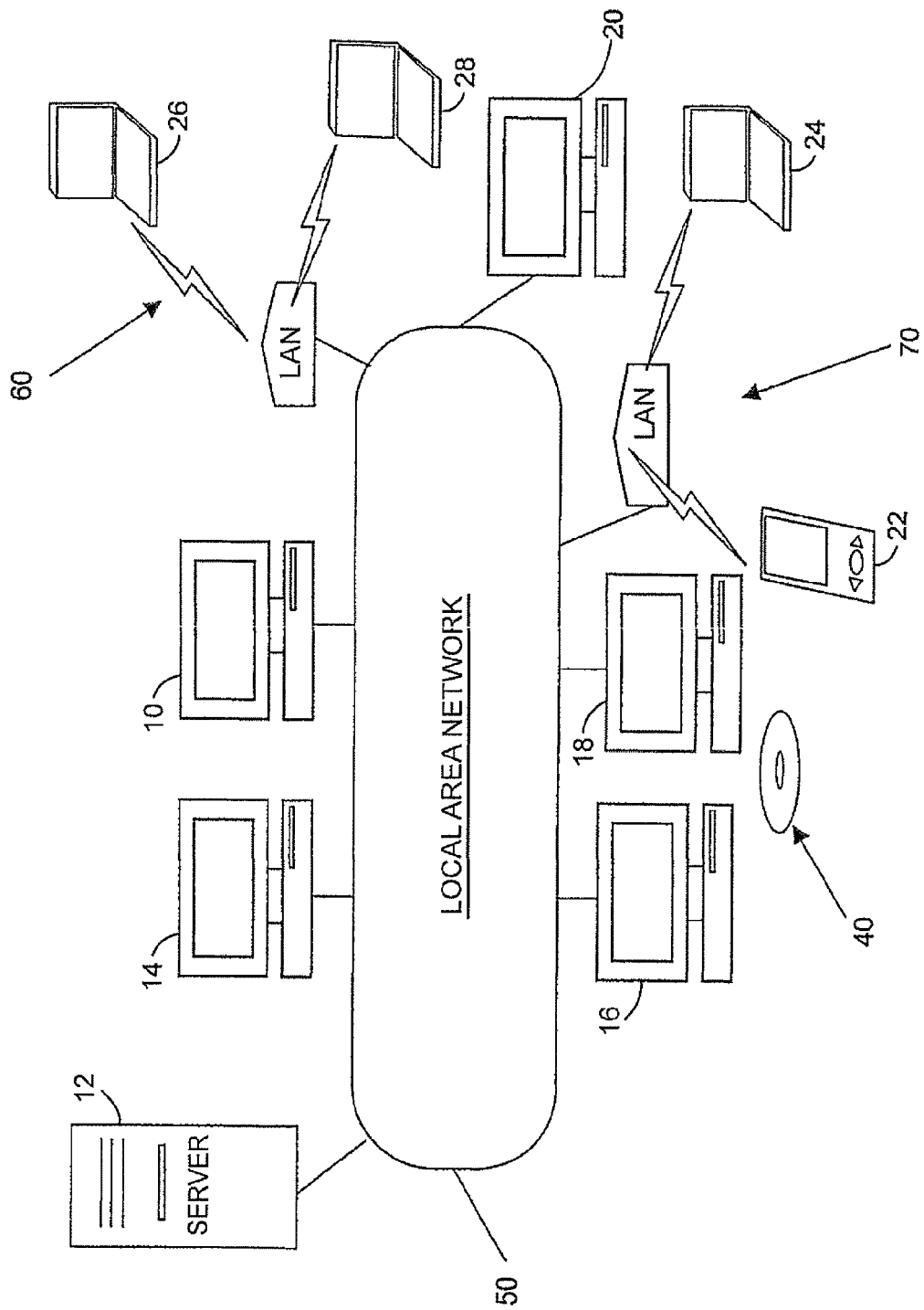
FIG. 1 is a schematic block diagram of a computer network according to the present invention.

FIG. 1 illustrates an internetwork comprising a fixed Ethernet 802.3 local area network 50 which interconnects first 60 and second 70 Ethernet 802.11 wireless local area networks.

Attached to the fixed local area network 50 are a server computer 12, and five desktop PCs (10,14,16,18,20). The first wireless local area network 60 has a wireless connection to a first laptop computer 26 and second laptop computer 28; the second wireless local area network 14 has wireless connections to a third laptop computer 24 and a personal digital assistant (pda) 22.

Also illustrated is a CD-ROM 40 which carries software which can be loaded directly or indirectly onto each of the computing devices of FIG. 1 (12-28) and which will cause them to operate in accordance with a first embodiment of the present invention when run.

Figure 2:
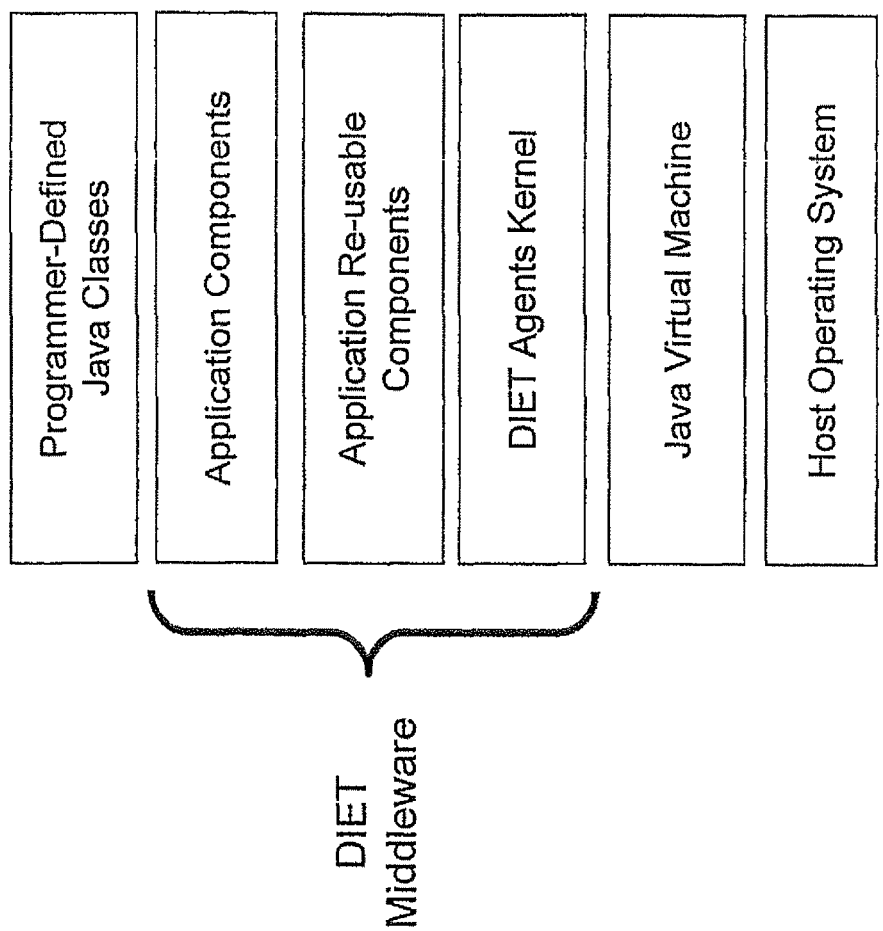
FIG. 2 is a diagram showing the architecture of the software used in first and second embodiments of the present invention.

FIG. 2 illustrates the architecture of the software controlling the computers (12 to 28) of FIG. 1. As is usual, each computer is provided with an operating system program. This operating system program will differ between different devices. For example, the operating system program on the personal digital assistant could be a relatively small operating system program such as Windows CE, whereas the operating system program running on the server 12 could be Linux, for example.

In the present embodiment, each of the computers is also provided with "virtual machine" software which executes the Java bytecode generated by a compiler of an application program written in the Java programming language. As its name suggests, such software converts a virtual machine language (that might be executed by a putative standard computer)—into the language of the actual machine on which the "virtual machine" software is installed. This has the advantage of enabling application programs in Java to be run on the different computers. Such software can be obtained from the Internet via http://java.sun.com for a number of different computing platforms.

In addition to this, each computer has a copy of the DIET middleware software installed. This software is available via the Internet at http://diet-agents.sourceforge.net. An earlier version of the middleware is described in the applicant's earlier European Patent application 1 237 082 A1. The DIET middleware has a three layer architecture, as follows.

The application layer contains code specific to particular applications, along with specific debugging and visualisation components.

The ARC layer provides Application Reusable Components. These components provide optional functionality that is available to application programmers.

The core layer provides the minimal software needed to implement multi-agent functionality in the DIET Agents framework.

The CD-ROM 40 contains client and host application programs and other classes written in the Java programming language. Each of the classes and the client application program are installed and run on one of the computers (for example on the PC 10). Each of the classes and the host application program is installed and run on the other computers. As will be understood by those skilled in the art, the application programs and other classes provided on the CD-ROM utilise classes provided as part of the DIET agents platform software.

Figure 3:
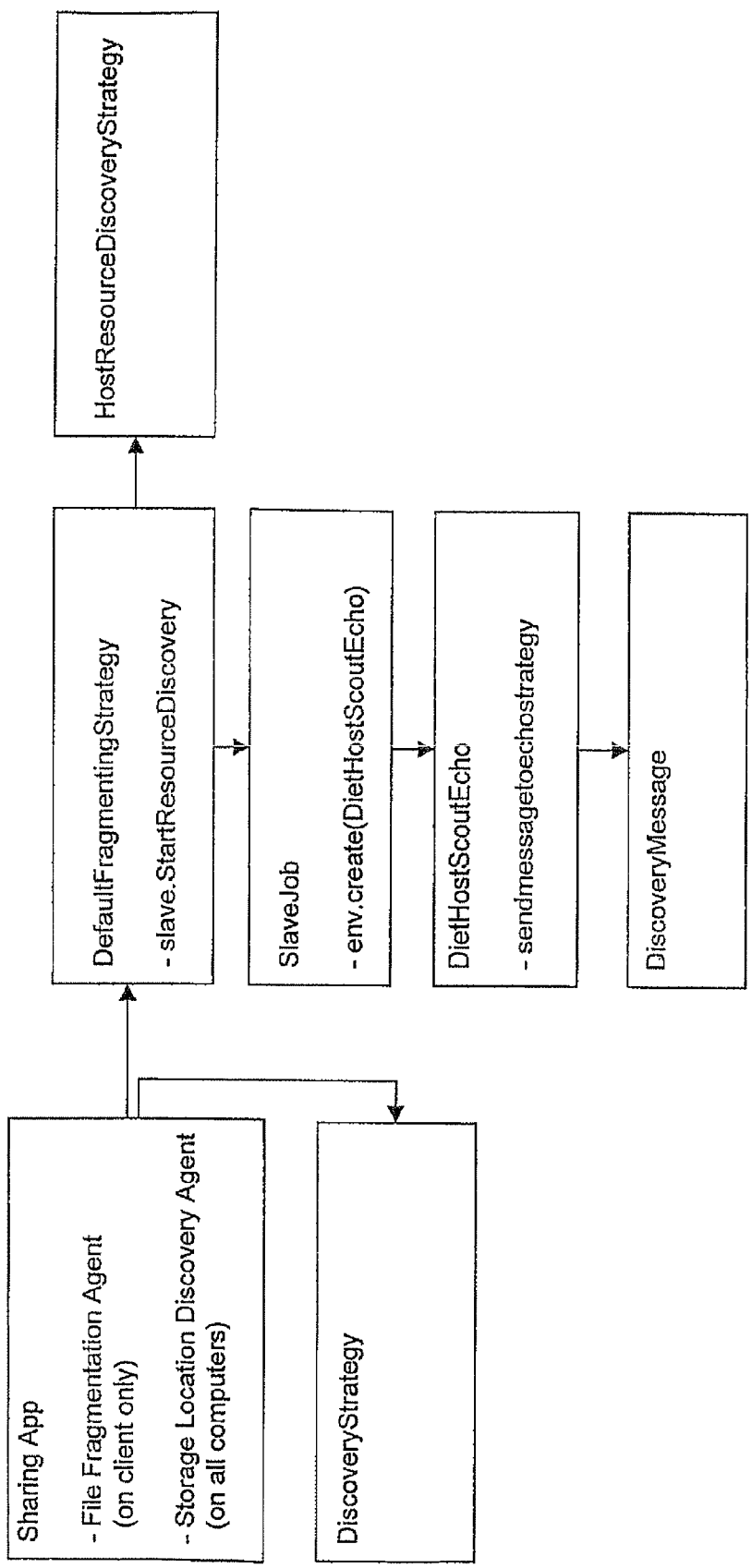
FIG. 3 is a class diagram showing programmer-defined Java classes used in first and second embodiments.

The application program and classes provided on the CD-ROM 40 are illustrated in FIG. 3. Also shown in that diagram are some of the important interactions between the different classes.

The host application program 'Sharing App' extends a basic application program (BasicApp) provided as part of the DIET middleware. It overrides BasicApp's fillWorld method to create at least one "environment" on each of the computers. In all cases, it initiates a DiscoveryStrategy object, creates a storage description agent (which is given the tag "echostrategy"), passing the DiscoveryStrategy object as a configuration parameter for the storage location record agent. In the version installed and run on the client computer 10, it additionally creates a file fragmentation agent.

Aside from the application program, the CD-ROM contains a number of classes. The required classes and the interactions between them and the application program are described below:

DefaultFragmentingStrategy: An instance of this class is created by the file fragmentation agent created by the client application program. The class includes an initiateFragmentation( ) method and a notifySampledHosts method (explained below). The initiateFragmentation( ) method uses the spawnHostResourceDiscovery( ) method of a SlaveJob object to create a storage locations record agent passing it a filename and an indication of the number of fragments into which the file is to be broken up before storage. Thus, like the file fragmentation agent, the storage locations record agent is only created on the client computer. It also calls the startResourceDiscovery( ) method of the SlaveJob class, again passing the number of fragments into which the file is to be broken.

The SlaveJob: Every agent created by the application programs has a SlaveJob associated with it. The SlaveJob provides methods which agents use to provide their functionality.

On execution of the startResourceDiscovery method, the method creates a DietHostScoutEcho agent, which is configured without a source or destination address, a token bucket instance variable set to the number of file fragments to be stored, and with a client address which is the address of the host on which the method is run.

DietHostScoutEcho: On the creation of a DietHostScoutEcho agent, (and also on a DietHostScoutEcho agent having successfully migrated to a new computer) its startUp( ) method is run which in turn runs a sendMessageToEchoStrategy method.

What happens when the sendMessageToEchoStrategy method is run depends upon a number of conditions, as follows:

a) If the agent has null source and destination address values, a DiscoveryMessage is sent to the local storage description agent;

b) If the agent has a source or destination address associated with it, the agent is in the environment indicated in its client address and the token bucket value associated with it is zero, then the agent connects to the local storage location record agent and passes the address of the computer which created the agent;

c) If the agent has a source or destination address associated with it, has a token bucket value of zero, and the agent is not in the environment indicated in its client address, then the agent calls a method provided by the environment to migrate it to the client. Once it has migrated there it will meet condition b) above and act accordingly;

d) If the agent has a source or destination address associated with it, and the destination address is the address of the computer at which it currently resides, then it sends a DiscoveryMessage to the local storage description agent; and e) If the has a source or destination address associated with it, and the destination address is not the address of the computer at which it currently resides, then agent calls a method provided in the environment in which it resides to migrate it to the destination address associated with the agent.

DiscoveryStrategy: As indicated above, an instance of this class is created on every computer in the network of FIG. 1. The class includes a method getDiscoveryMessage( ) which, on being passed a DiscoveryMessage object, runs the test specified in the DiscoveryMessage object (the test can simply be identified by a character string, for example). If the test is passed, it calls the sendNeighbourTokens method of a Slave-Job object with the "token bucket" value set to zero. This creates a DietHostScoutEcho agent which carries the details of the DiscoveryMessage back to the storage location record agent on the client computer indicated in the DiscoveryMessage. It will be realised that the DietHostScoutEcho agent thus created will follow behaviours b) and c) above in order to communicate details of the computer which has successfully passed the test back to the storage location record agent on the client computer 10.

In addition to carrying out the above actions, on getting a DiscoveryMessage, the getDiscoveryMessage( ) method looks at the value of the token bucket in the DiscoveryMessage, divides the value of the token bucket as evenly as it can between the neighbours of the computer on which the DiscoveryMessage was received and then creates a DietHostScoutEcho agent for each neighbour carrying the thus divided token bucket value and the address of the client computer.

HostResourceDiscoveryStrategy: On receiving a DiscoveryMessage from a DietHostScoutEcho agent, this adds the computer from which the agent came to the list of suitable hosts for storing a fragment of the file. It keeps count of the number of suitable hosts so far indicated, and when that number is equal to the "token bucket" associated with the distributed file storage, this is called a sampleHosts( ) method of the SlaveJob class, passing it the "token bucket" value, the address of the client computer, and an array of addresses of computers that have passed the test for storing a fragment of the file.

The sampleHosts( ) method creates a DietHostScout agent which communicates the list of storage locations to the DefaultFragmentingStrategy object using that objects notifySampledHosts( ) method mentioned above.

DiscoveryMessage: This class defines an object which includes the following variables, and so-called "getter" methods for providing those variables to other objects:
i) a current address;
ii) a destination address;
iii) a number of hops limit;
iv) a token bucket value;
v) a character string representing a test to be carried out;
vi) a filename;
vii) a client address.

Figure 4:
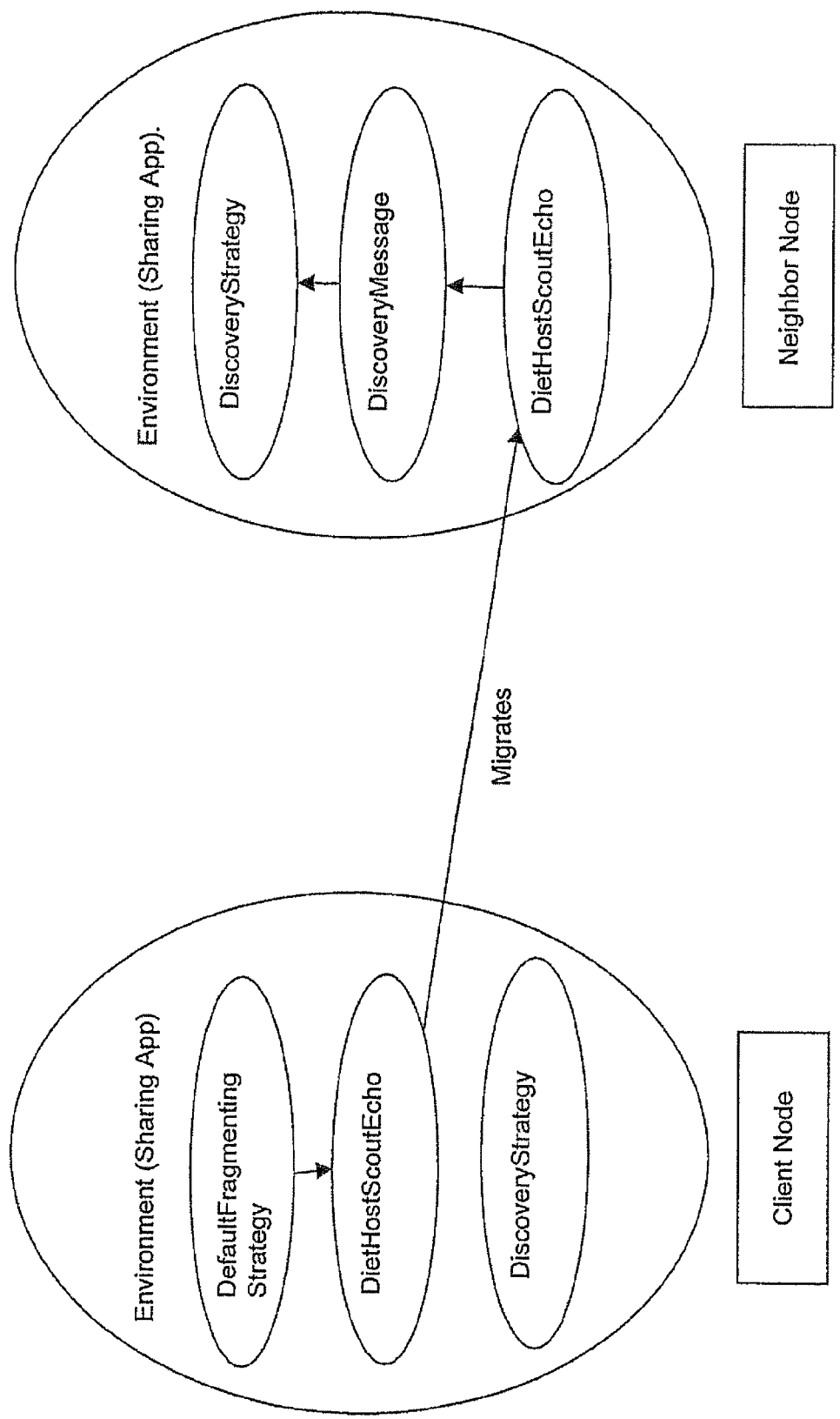
FIG. 4 is a diagram illustrating where some of the programmer-defined classes are run in the first and second embodiments.

Thus, with reference to FIG. 4, it will be understood that the DefaultFragmentingStrategy on the client machine calculates the number of fragments into which the file to be stored is divided and creates a DietHostScoutEcho agent which contains an indication of a test which must be passed by a computer in order to be suitable for storing a fragment of the file and a token bucket value initially set to the number of fragments to be stored. At first the source and destination address fields are null.

In the first instance, the agent communicates with the local storage description agent which runs the test. If the local computer passes the test, then a message indicating that the test has been passed is sent to the storage location record agent (which will be on the same computer). The local storage description agent then divides the number of fragments between its neighbours, and sends appropriately configured DietHostScoutEcho agents to them.

On receiving those agents, each of those neighbours carries out the test, reporting its address to the storage location record agent if it successfully passes the test. As before, the token bucket value is divided between the neighbours, and DietHostScoutEcho agents sent to each of them.

When the local storage record agent at the client has received a number of suitable storage addresses which equals the token bucket value included in the original message, it divides the file to be stored amongst those addresses.

A more advanced process of finding suitable storage locations for the file fragments will now be illustrated with reference to FIGS. 5 to 8, In this case, the use of agents to transfer messages between the different software components is not described—however, it is to be understood that such a mechanism for communicating information between classes could be used. Alternatively, the communication between the software components could take place using standard Java techniques for such communication such as Remote Method Invocation. This example supposes that PC 10 seeks to discover six on-line devices capable of storing one fragment each.

FIGS. 5 to 8 illustrate the same network as that shown in FIG. 1 but re-drawn to illustrate the configuration of an "overlay" network used by the devices when generating or processing requests concerning the discovery process. This overlay network is referred to as an application layer network because the discovery application enforces the restrictions of the overlay network (on which devices may communicate directly with which other devices) despite the underlying layers (ie the transport/network layers) not being so restricted (as illustrated in FIG. 1, each on-line device at the network/transport layer may communicate directly with any other on-line device via the Ethernet 50 and the wireless LANs 60,70). The reason for imposing the overlay network is to improve the efficiency with which the discovery process is performed. The manner in which the overlay network is created is discussed in greater detail below.

Figure 7:
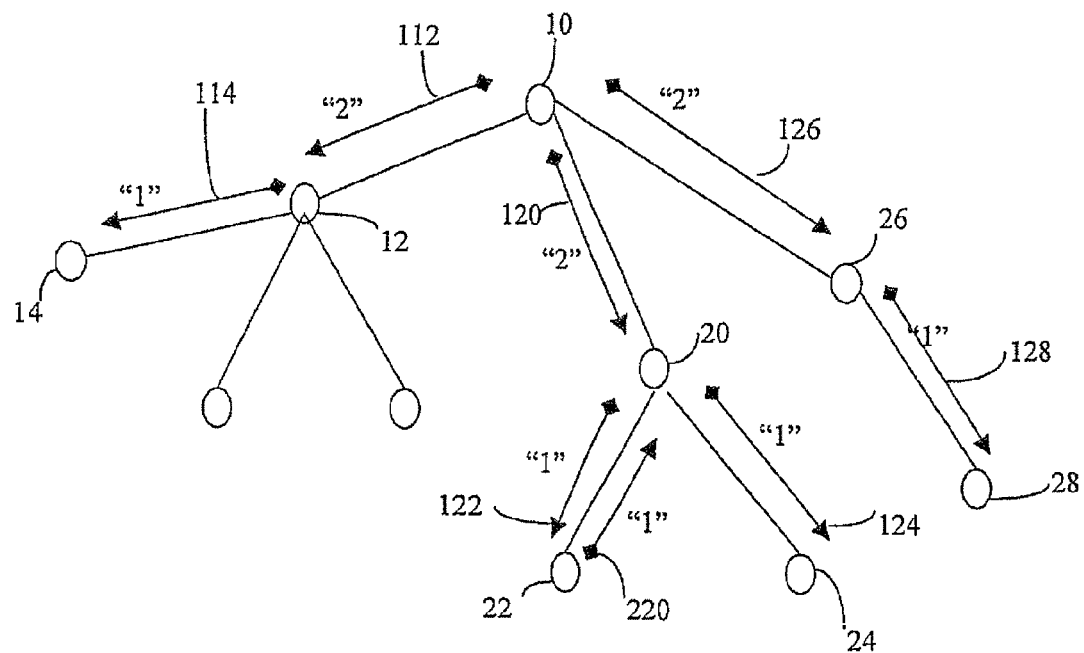
FIG. 7 is a schematic diagram similar to FIGS. 5 and 6 illustrating a single discovery process.

In overview, the discovery process of the present embodiment as illustrated with the example of FIG. 7 comprises the device generating three messages 112, 120 126 each of which has the purpose of identifying two suitable on-line devices to which device 10 may distribute a fragment. These messages are sent respectively to the three on-line devices 12, 20, 26 neighbouring device 10 (according to the overlay network—two devices are said to be neighbouring if the overlay network permits them to communicate directly with one another as illustrated by a line connecting the two devices in FIGS. 5 to 8, the term is only used with respect to the overlay network because at the transport/network layer all devices would be neighbouring and so the term would be redundant). In this example, the token bucket of each message is set to the value of two, adding up to six devices to be discovered in total. The test run by the DiscoveryStrategy whether the computer on which it is running has enough space available to permit it to store a fragment of a given size (eg where each fragment has size 100 Kbytes the condition might be: disk space available for distributed storage $\geq$100 Kbytes).

The above software forms a mechanism that might be used in a distributed storage system or decentralised file system. An example of such a decentralised file system is described in Robertson, D. et al, "Persistent, Reliable, Decentralised File System—DFS" presented at the London Communications Symposium 2002. As mentioned in that paper, the file fragmentation methods could use a number of different erasure codes. Example erasure codes which could be used are described in N. Alon, J. Edmonds, M. Luby, "Linear Time Erasure Codes With Nearly Optimal Recovery", Proc. of the $36^{th}$ Annual Symp. on Foundations of Computer Science, 1995, pp. 512-519, and a paper by John Byers, Michael Luby, Michael Mitzenmacher entitled *"Accessing Multiple Mirror Sites in Parallel: Using Tornado Codes to Speed Up Downloads"* which appears as ICSI Technical Report TR-98-021, Jul. 1998, and is currently available for viewing at the following URL: http://www.icsi.berkeley.edu/~luby/PAPERS/mirrdown.ps. The tornado code is especially preferred because of the improved coding and decoding speeds.

In the preferred implementation of the first embodiment, the overlay network is formed using a policy based mechanism such as that described in co-pending European patent application No. EP 0254294.8. However, any appropriate method can be used such as, for example, the method described in co-pending UK patent application No. GB 0226762.3 or simply having a single master device centrally imposing a predetermined overlay network, predetermined by a human operator, on the other devices in the network by informing them as to who their neighbours are. In a preferred implementation, these neighbours are then stored in a first table which stores all of its known neighbours; a second table then stores details of its neighbours, which are currently on-line, together with a set of associated probabilities which reflect the anticipated relative probabilities of the associated devices successfully disposing of tokens (by identifying suitable devices). The manner in which these probabilities are used in the present embodiment is discussed in greater detail below with reference to FIGS. 6, 7 and 8.

A further enhancement to the basic discovery method which is included in the presently described implementation of the present embodiment is the inclusion of a maximum hop count in each message, which is decremented by each device which receives a new message until the hop count has reached zero whereupon the message is passed back towards the originating device. This enhancement is effective to prevent the dissemination through the entire network of a message which has, for example, too difficult a set of conditions to be satisfied.

The inclusion of probabilities, together with hop count, enables the tokens to be distributed in such a way that computing resources are quickly identified without consuming all connected nodes computing resources. If a path can not dispose of its allocated tokens, then the probability associated with this path may be modified to take this failure into account. Unused tokens are then passed back through the network until all tokens are resolved or returned to the client. This would be because the network isn't large enough to cope with the demand for all the tokens, the condition(s) or test parameter(s) is (are) unacceptable or not enough computers have been found within the radius of the hop count set by the originating device to satisfy the token bucket.

As explained above, the present implementation uses software written in the java programming language to implement the above described functionality. In particular, each participating device on the network (ie each on-line device) runs a discovery algorithm or daemon (also referred to as a Discovery Strategy) which continuously waits to receive discovery request messages and responds to these messages when they are received (as will be appreciated by a person skilled in the art, this can be implemented with a runnable class which then runs as a thread which can run continuously in parallel with any number of other threads).

When a device wishes to store a data file, it is designated the client machine or client host and, once the client host has prepared the fragments to be stored, it starts to run a HostResourceDiscovery algorithm (hereinafter referred to as a HostResourceDiscovery Strategy which may again be implemented as a runnable class). The HostResourceDiscovery Strategy is responsible for making sure that either all tokens are consumed (ie that sufficient devices satisfying the message condition(s) have been identified) or ensuring that the user is made aware of the failure to identify sufficient qualifying devices (and giving the user the possibility to modify the message condition(s), if possible, to improve chances of success). There are two ways in which the HostResourceDiscovery Strategy can be triggered into reporting a failure back to the user; either it hasn't received the required number of token acceptances in a predetermined time period (this is settable by the user, in a small network such as that illustrated in FIG. 1, a few seconds would be appropriate, in a larger network up to or even beyond a minute might be appropriate) or (and this should be the more normal method) some tokens have been returned back to the originating device with no more possible paths to try to send the tokens down.

The HostResourceDiscovery Strategy is initiated with a given size for the token bucket, n (which in the example illustrated in FIGS. 2 to 5 is given by n=6). This parameter is recorded by the HostResourceDiscovery Strategy and is compared with the total number of token acceptance messages which it has received every time a new token acceptance message is received.

The HostResourceDiscovery Strategy then initiates the discovery process, in the present embodiment, by sending a request message to the Discovery Strategy running on the client host. In the present embodiment, the message includes the following fields or parameters: previous address; target address; token bucket; test; file-name identifier; number of allowed hops; and client address. In the starting request message sent by the HostResourceDiscovery Strategy, the previous address and client address parameters are set to null (this is identified by the Discovery Strategy running on the client host which is therefore able to recognise itself as the originating device or client host). Note that the "test" field holds the condition or conditions to be met by identified devices.

As mentioned above, every host or device participating in the decentralised file system is running a discovery strategy. When the discovery strategy running on the client host receives the discovery message from the HostResourceDiscovery strategy it performs the following tasks.

The Discovery Strategy maintains two Hashtables (a type offered by the Java Virtual Machine). The first contains all known neighbours and their overall probabilities (note that initially the overall probabilities are initially set to be equal, but are modified subsequently as described below). The second table contains currently on-line neighbours and normalised probabilities. Upon receipt of the discovery message, the Discovery Strategy updates its second table by determining which of its neighbours are on-line and re-calculating normalised probabilities on the basis of the over-all probabilities for these neighbours as stored in the first table.

Thereafter, the Discovery Strategy reads the values of the previous and client address parameters contained in the received discovery message and notes that these are null (thus establishing that it is the originating device), whereupon it generates one or more discovery messages to pass on to one or more of its neighbours in accordance with the probabilities contained in the second hash-map table and the value of the token bucket parameter in the received discovery message.

Figure 5:
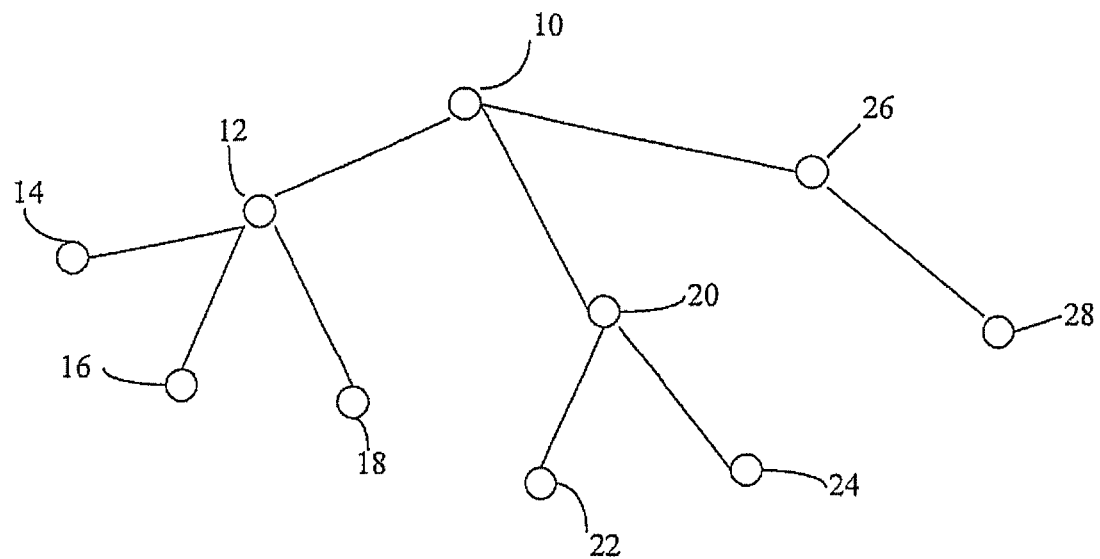
FIG. 5 is a simplified schematic diagram of the computer network of FIG. 1 illustrated from the point of view of one of the computers within the network of FIG. 1.
Figure 6:
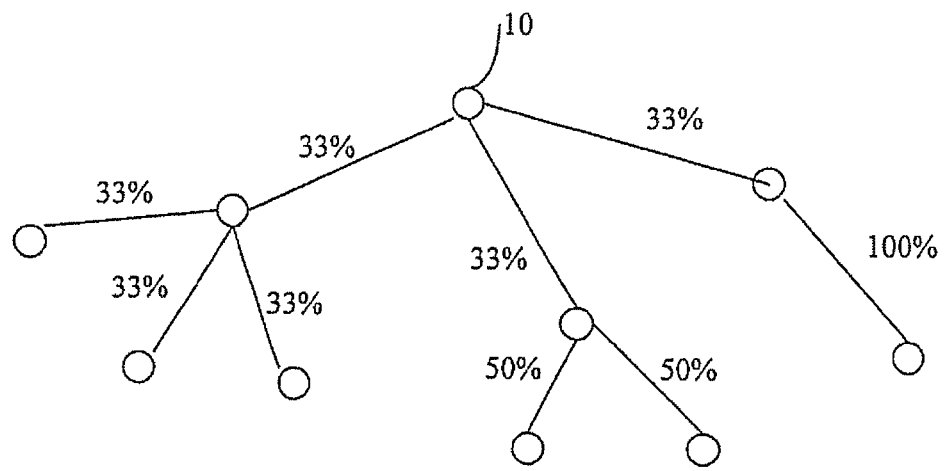
FIG. 6 is a schematic diagram similar to FIG. 5 showing the original assignment of probabilities to paths assigned by devices within the network.
Figure 9:
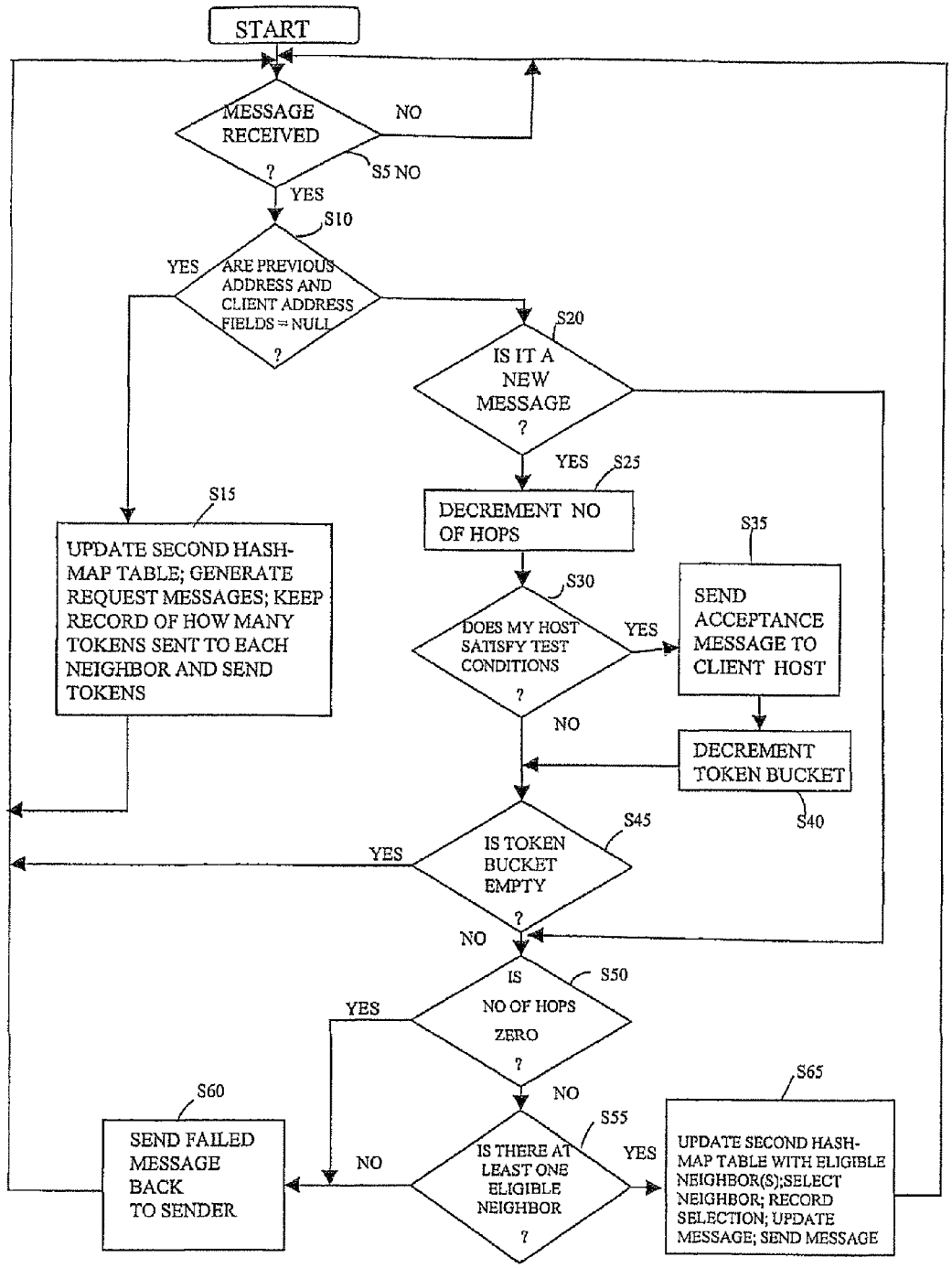
FIG. 9 is a flow chart describing the steps performed in carrying out a discovery process such as that illustrated in FIG. 7.

Thus, referring to FIG. 5, together with FIG. 9 which is a flowchart illustrating the processing performed by each Discovery Strategy, it can be seen that in the present example, after receiving a message at step S5, the device 10 determines that it is the originating device at step S10 and proceeds to step S15 in which it updates its second hash-map table by noting that it has three neighbours stored in its first hash-map table, namely server 12, desktop computer 20 and laptop computer 26, with each neighbour having an (initial) equal probability of ⅓. The Discovery Strategy then determines that all three of its neighbours are on-line and thus calculates normalised probabilities which are again therefore each equal to ⅓. Since the token bucket value is six, it generates one message to each of its neighbours with each message having a token bucket value of 2 (where a perfect distribution is not possible a weighted random selection is made instead, e.g. if the token bucket value were 5, one of the neighbours would have been selected at random whose message would have a token bucket value of 1, with the other two having values of 2 each, etc.). The Discovery Strategy then makes a record of which neighbours it has sent tokens to and returns to step S5 to await receipt of a further message.

The newly generated messages (which now include non-null values for the previous address and client address fields) are then passed on to the respective neighbours. In the present example, this is illustrated in FIG. 7 by the arrows 112, 120, 126 marked "2" to indicate that 2 tokens are conveyed to devices 12, 20 and 26 respectively. The Discovery Strategies running on the neighbouring devices which receive these messages (step S5) firstly note that the client address parameter is non-null (and thus determines that they are not the originating device at step S10) and then (at step S20) check to see if it is a new message (ie whether the message is heading away from the originating device or if it is a failed message returning towards the originating device). If it is a new message (which is determined by checking to see if it has a record of the filename string identifier contained in the message) it makes a note of the filename string identifier contained in the message so that it will be able to recognise returned failed messages relating to the current data file to be stored in the future, and then performs the following tasks.

Firstly (at step S25), it decrements the number of hops field by 1.

Then it determines (at step S30) whether it satisfies the condition or conditions set out in the test field in the message. If it does, it sends (at step S35) a token acceptance message back to the device indicated by the client address stored in the client address field in the request message and decrements (at step S40) the token bucket value by 1.

The Discovery Strategy then checks the token bucket value (at step S45) to establish if any further tokens need to be sent out. If the token bucket is zero the Discovery Strategy need do nothing further except await further request messages (by returning to step S5).

If, however, there are further tokens to be consumed, the Discovery Strategy checks (at step S50) that the number of hops has not yet reached zero. If it has it returns (at step S60) the message back to the neighbour from which it received the message.

If the number of hops is greater than zero, the Discovery Strategy checks (at step S55) that it has at least one eligible neighbour onto which it may forward the message (it does this by checking which of its neighbours are on-line but disregarding the neighbour who has sent it the message and any neighbours who have already tried and failed to consume the tokens—this last option applies only to old messages being re-tried). If it does have at least one eligible neighbour it updates (at step S65) its second hash-map table by checking which of its neighbours are on-line, but disregarding the neighbour who has sent the message (as determined from the previous address field of the message) and determines a normalised probability for each online neighbour in the second hash-map table. Then, in the present embodiment, the Discovery Strategy forwards on only a single message to one of the neighbours in the second table chosen at random according to the associated probabilities for each neighbour contained in the second table (ie if one neighbour had an associated probability of 75% and the other an associated probability of 25%, the first neighbour would be three times as likely to be selected as the second neighbour).

The forwarded message has the current value of the token bucket and updated values for the previous and destination address fields (indicating the current device address and the selected neighbour device address respectively). The Discovery Strategy on the current device also then makes a record of the selected neighbour and the neighbour from which it originally received the message in case it needs to use this info later for retrying failed messages. Finally the Discovery strategy returns to awaiting further messages (at step S5).

If the Discovery strategy determines either that there is no eligible neighbour to send the message on to (at step S55) or that the number of hops has been decremented to zero (at step 850), then (at step S60) the message is passed back to the sending device. If the message is a new message, this is determined from the previous address field in the message. If the message is an old message, then the sender is determined from the record maintained by the device when it first forwarded on the message.

Figure 8:
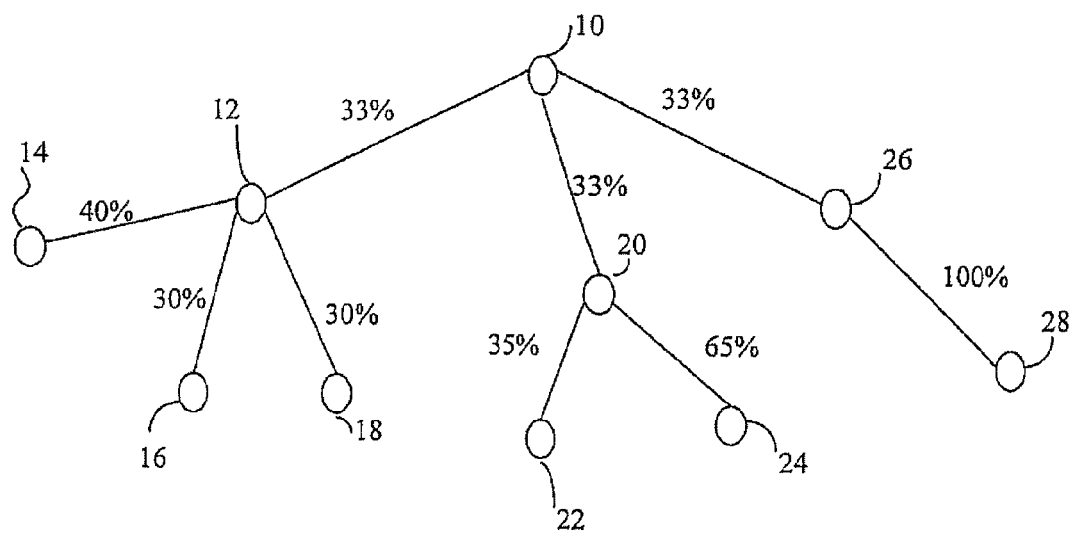
FIG. 8 is a schematic diagram similar to FIGS. 5, 6 and 7 showing the modified assignment of probabilities to paths subsequent to the discovery process illustrated in FIG. 7.

Referring again now to FIG. 6, together with FIG. 8, it can be seen that in the present example when device 12 receives the request message indicated by arrow 112, it firstly establishes (at step S10) that it is not receiving an originating request message since the previous address and client address fields are non-null (they have device 10's address); it also checks that it is a new message (at step S20) by checking its records and noting that the file-identifier is new to it, whereupon it decrements (at step S25) the number of hops field (in this example, say from 5 to 4). The Discovery Strategy of device 12 then checks (at step S30) to see if it satisfies the conditions set out in the test field (in this example, whether it has disk space available for storing 100 Kbytes), it determines that it does satisfy this condition and thus sends (at step S35) an acceptance message to the client host device 10 and then decrements (at step S40) the token bucket by 1; it notes (at step S45) that the token bucket still has one remaining token to be disposed of; it checks (at step S50) that the number of hops is still greater than zero (in this example, it's now 4); it then determines (at step S55) that it has 3 eligible neighbours onto which it may forward the message, whereupon it updates (at step S65) its second hash-map table and selects at random one of its eligible neighbours (in this case device 14) to which it sends a message indicated by arrow 114 including one remaining token left to dispose of and keeps a record of this before returning to await a further request message.

Devices 20 and 26 perform similar tasks and thus send on messages indicated by arrows 122 and 128 with one token each to portable digital assistant (pda) device 22 and laptop computer device 28, respectively.

In this example, desktop computer 16 and laptop computer 28 both have sufficient storage to meet the test condition and therefore both send acceptance messages back to the client host and then perform no further processing. However, pda 22 does not satisfy the test condition (at step s30) and determines (at step S55) that it has no eligible neighbours to forward on the message to and therefore (at step S60) it returns the message back to desktop computer 20 as indicated by arrow 220 showing one token still to be disposed of.

When this returned or failed message is received by device 20, it determines (at step S20) that it is not a new message, it checks (at step 850) that the number of hops field is not zero (it is now 3) and determines (at step S55) that there is still one eligible neighbour (laptop computer 224) to send the message on to which it proceeds to do (at step S60) whilst updating its records to indicate that now it has tried neighbouring devices 22 and 24. If device 24 were not able to satisfy the test condition either, device 20 would then have to pass the failed message back up to device 10. However, in this example device 24 is able to satisfy the request and so the process comes to an end with all of the tokens having been delivered.

Once the distribution of tokens for a particular file identifier has been completed, in the present embodiment, the overall probabilities associated with the various paths are updated in the first hash-map table maintained by each discovery strategy. In the present embodiment, this is done by adding a finite number (eg 10) to each path which successfully disposes of a token, and subtracting the same number from any path which fails to dispose of a token and then renormalizing (if necessary). Note that in the present embodiment, the overall probabilities are stored as percentage integers. Thus, as shown in FIG. 8, none of the probabilities stored in the first hash-map table of device 10 change since of the three possible paths, each path successfully disposed of 2 tokens each. At device 12, the path to device 14 has successfully disposed of one token and thus the probability associated with this path is increased (originally 25% to each neighbour, "probability" to 14 is increased by 10 to 35, which, after re-normalisation, becomes 35/110=31% to device 14, 25/110=23% to each remaining device; if a new request were received from device 10, this would correspond to probabilities of 40% to device 14 and 30% to each of devices 16 and 18 as shown in FIG. 5). At device 20 the path to device 22 failed to dispose of a token while that to device 24 succeeded thus these probabilities are decreased and increased respectively (originally 33% each, path to 24 is increased to 43%, path to 22 is decreased to 23%; if a new request is received from device 10, this would correspond to probabilities of 65% to device 24 and 35% to device 22). In the present embodiment, the probability associated with a particular neighbour is never allowed to reduce below a small minimum to ensure that it will always be tried as a last resort.

In an alternative embodiment though, the probabilities are used to modify the overlay network with devices having low probabilities being asked to re-register with say another of the devices neighbours also having a smallish probability etc to minimise the amount of requests being sent to and from low probability devices.

Variations on the Above-described Embodiment

In the above described embodiment, any one participating device was able to publish documents to the decentralised file storage system. However, one particularly useful application of this technology might be to provide a secure archive service for a large number of individuals. In such a case, the overall architecture might comprise a trusted closed network of computers, connected, via a gateway server with a secure firewall in place, to a large number of individual clients who wish to store data on the secure servers. A client with a file to be stored then sets up a secure communication with the gateway server (eg using HTTPS protocol or by sending and receiving encoded messages using an encryption such as public/private key encryption). The gateway server can then perform the fragmentation transparently to the remote client and store the fragments in a distributed manner around the secure servers in the trusted closed network. The gateway server then simply stores details of where the fragments for a particular file have been stored. This information is much less than the stored data itself and so conventional mechanisms for ensuring it is not lost can be used such as providing multiple back up copies etc.

In the above embodiment, only the originating client host generates multiple messages to go out to a plurality of its neighbours. However, in alternative embodiments, each discovery strategy could send out multiple messages to multiple neighbours ensuring that the token bucket is divided in a way which reflects the probabilities associated with each eligible neighbour. With such a scheme, it would be beneficial to have a facility to send returned failed messages back down paths where no failures have yet been received, possibly with a suitable delay to give all paths a reasonable time to come back with failures of their own. With such a scheme, it would be beneficial for each discovery strategy to maintain a record of acceptance messages which it has sent, at least until a corresponding fragment has finally been sent and stored by the device, to prevent the device accepting more than one token for a given file-identifier.

In the above example the test condition was that of free storage space. However, the system is applicable for discovering the availability of any resource (eg bandwidth, processing power for distributed computing applications, etc.). Furthermore, the method can be used for very different applications (eg finding likely matches for a search on a database, for connecting people with similar interests together to form a chat group, etc—the important factor being that there must be some predefined quorum number (ie the number of tokens) of items (eg matches or people) to be discovered). As another example, instead of having the client computer (or in the case of a gateway server acting on behalf of a remote client, the gateway server) storing details of where the fragments of a particular file are stored, the client could simply send out a discovery message requesting the (minimum number required to restore the file of) fragments. The test condition would then be whether or not the device is storing one of these fragments. Once discovered, the client then simply requests each discovered computer to send a copy of its stored fragment to the client.

Another embodiment of the present invention in which a policy-based mechanism is used to determine where to store a file (which might, for example, be a file representing a piece of content such as a web-page, or an audio or video file) will now be described with reference to FIGS. 10A-10C and 11 to 14.

Figure 10A:
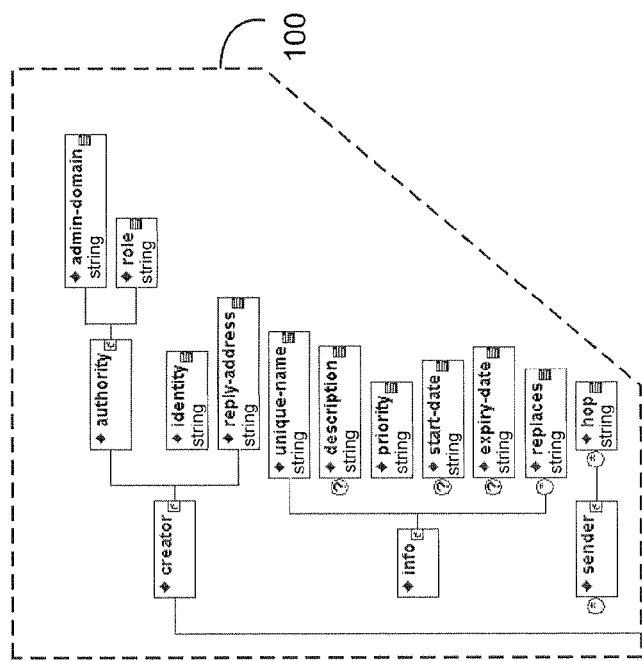
FIG. 10 is a map for assembly of FIGS. 10A-10C showing a tree diagram representing a document type definition for a standard policy document.
Figure 10B:
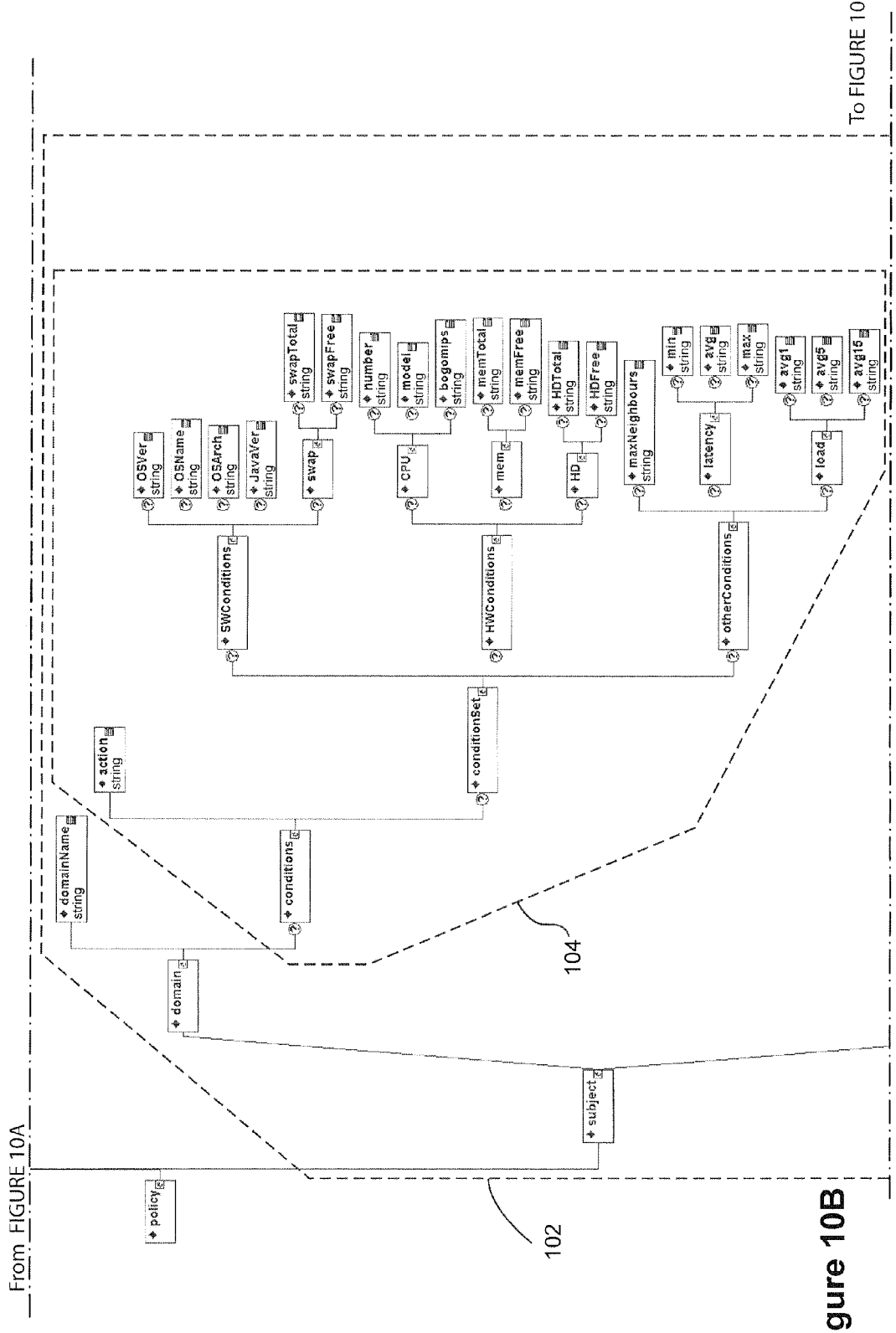
Figure 10C:
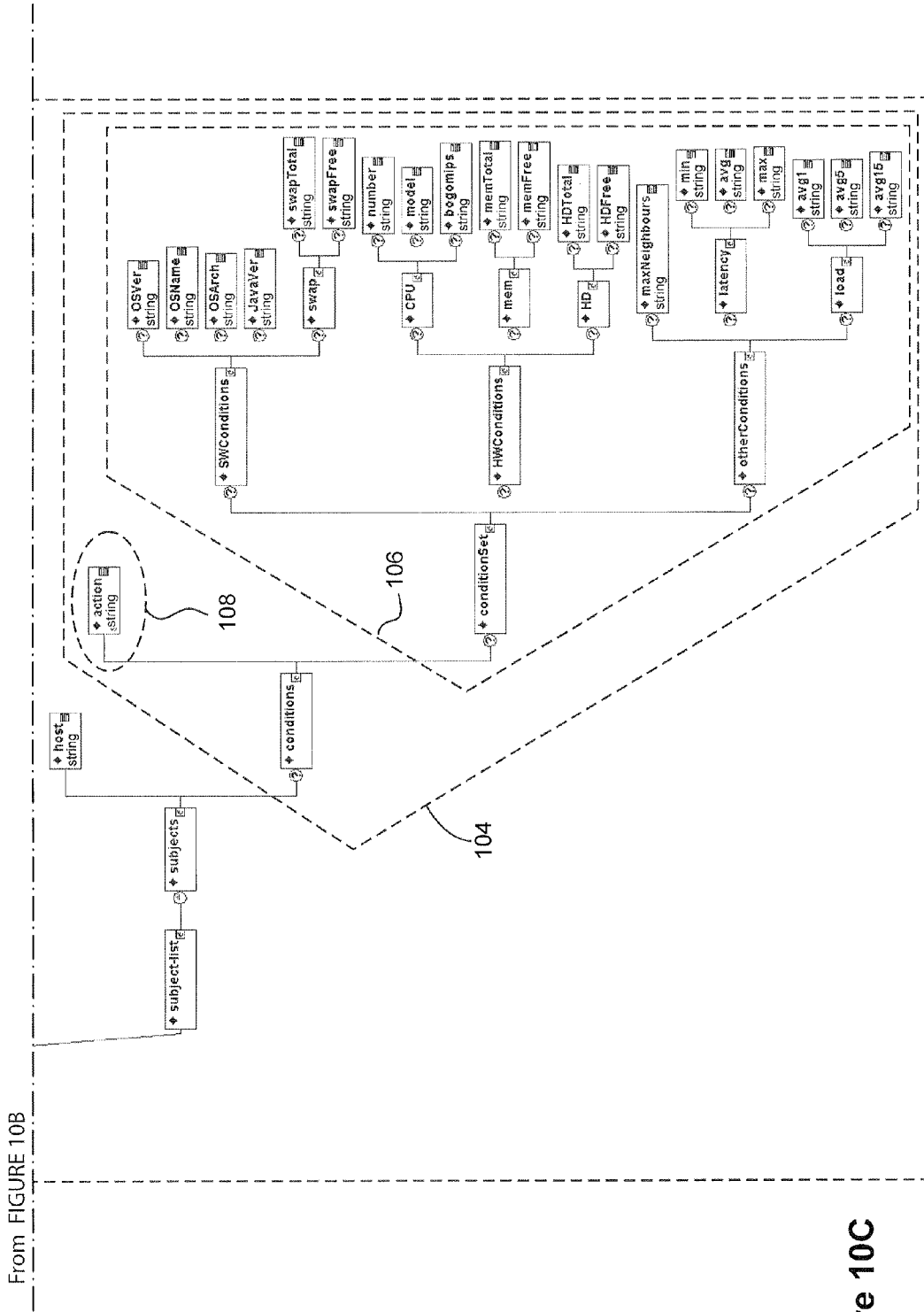

FIG. 10 is a map for assembly of FIGS. 10A-10C showing, in tree diagram form, a Document Type Definition (DTD) which indicates a predetermined logical structure for a 'policy' document written in eXtensible Mark-Up Language (XML). One purpose of a 'policy' document in this embodiment is to set out the conditions which an applicant computing device must fulfill prior to a specified action being carried out in respect of that computing device. In the present case, the action concerned is the storage of a file at a computing device in a distributed computing network.

As dictated by the DTD, a profile document consists of two sections, each of which has a complex logical structure.

The first section 100 refers to the creator of the policy and includes fields which indicate the level of authority enjoyed by the creator of the policy (some computing devices may be programmed not to take account of policies generated by a creator who has a level of authority below a predetermined level), the unique name of the policy, the name of any policy it is to replace, times at which the policy is to be applied etc.

The second section 102 refers to the individual computing devices or classes of computing devices to which the policy is applicable, and sets out the applicable policy 104 for each of those individual computing devices or classes of computing devices.

Each policy comprises a set of 'conditions' 106 and an action 108 which is to be carried out if all those 'conditions' are met. The conditions are in fact values of various fields, e.g. processing power (represented here as 'BogoMIPS'—a term used in Linux operating systems to mean Bogus Machine Instructions Per Second) and free memory.

Figure 11:
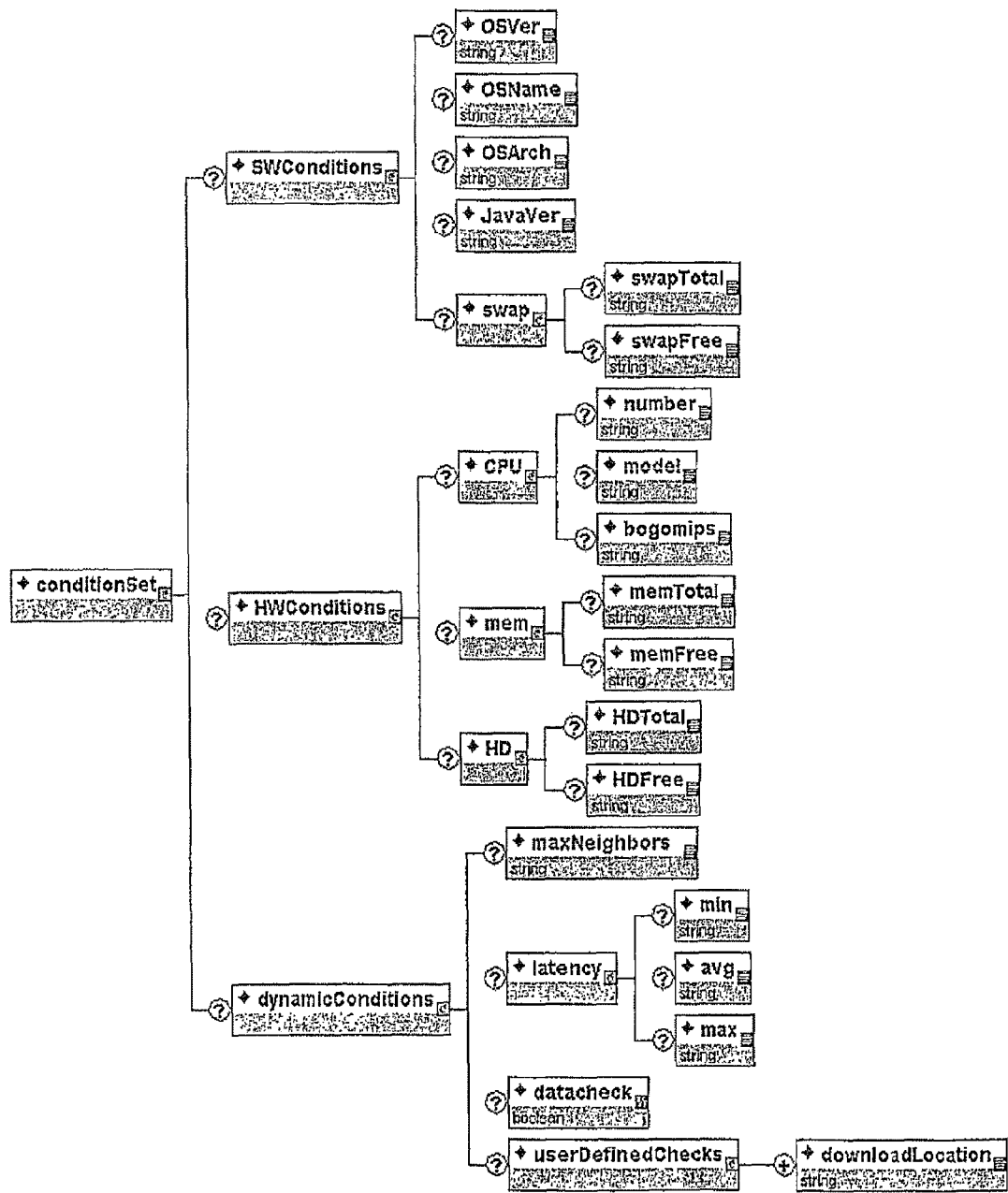
FIG. 11 shows a variation to the document type definition used in policy documents in a second embodiment of the present invention.

An example of a variation to the set of 'conditions' 106 which might be used in the present embodiment is shown in FIG. 11. It will be seen that the condition set includes a "datacheck" condition and a user defined check condition— which can itself have a downloadLocation associated with it.

In the present embodiment, it is anticipated that some of the files stored by the computers of FIG. 1 might have metadata associated with them. This, might, for example, indicate the type of content represented by the file—for example, music. It could include more specific information such as the genre of music represented, or the name of performer of the music. If the file were a news item then the field of that news item could be indicated—e.g. UK, politics.

In the above-described embodiment, the test carried out in determining whether store a fragment of a file was programmed as part of the DiscoveryStrategy class provided on each computer of FIG. 1. However, the test could be a Java class (or other executable file) loaded from another computer on the network, or form a computer reachable from the network via the Internet, for example. Such a user-defined check could be referenced in the userDefinedChecks field of a policy constructed in accordance with the DTD shown in FIGS. 10A-10C and 11.

It will be remembered that the DietHostScoutEcho agent described above carried variables such as the number of fragments into which a file was to be broken down between the computers of FIG. 1. In the present embodiment, the agent is modified to carry a file (or a reference to its location) and a policy constructed in accordance with the DTD shown in FIGS. 10A-10C and 11.

Figure 12:
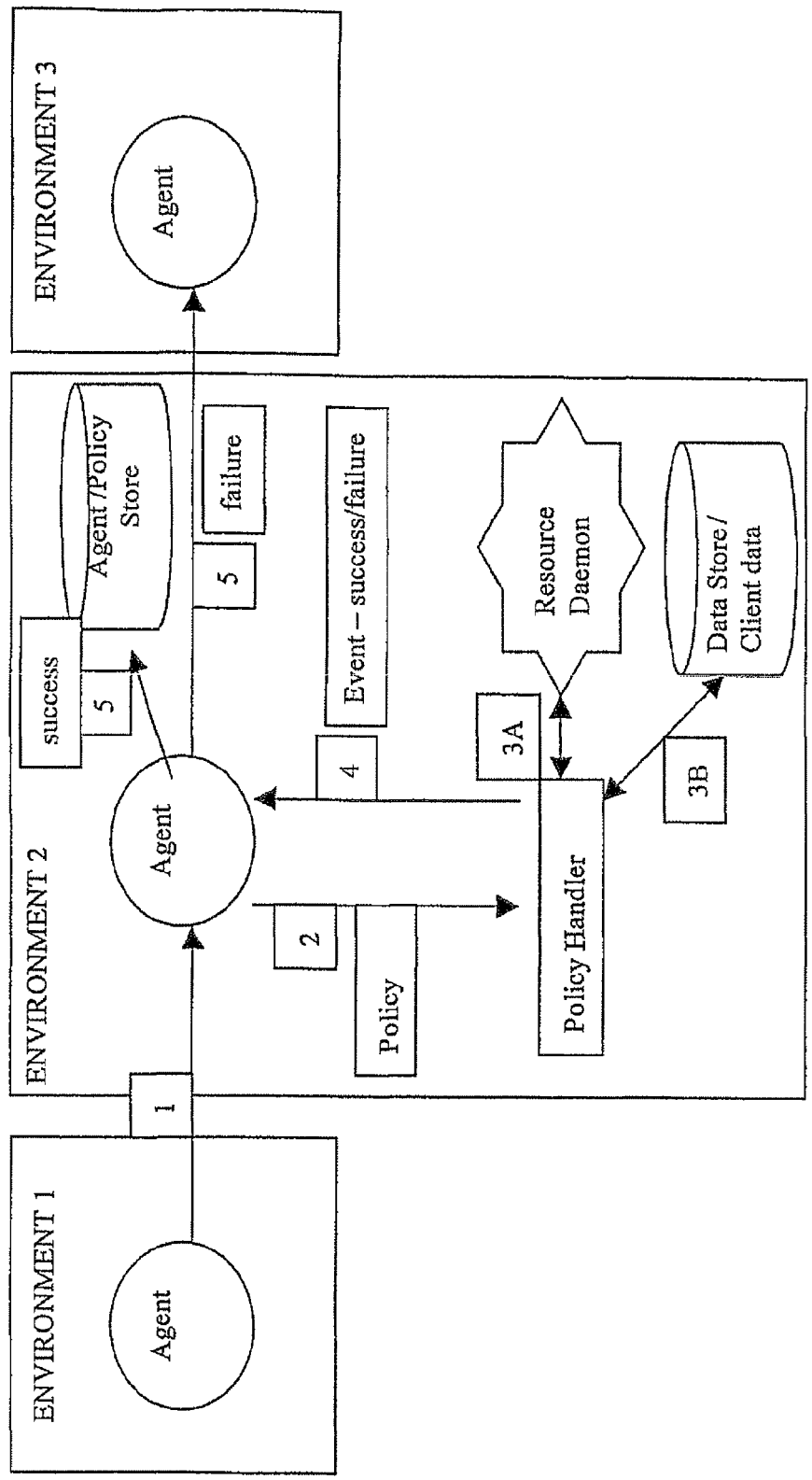
FIG. 12 is a schematic showing an overview of the operation of the second embodiment of the present invention.

The operation of the present embodiment will now be described with reference to FIGS. 12 to 14. Whereas in the embodiment described above, the arrival of the agent at a computer triggered the sending of a message to the DiscoveryStrategy running on that node, in the present embodiment, the arrival of the agent at a node sends a message to a policy handler class (this would, of course, be one of the user-defined Java classes illustrated in the architecture of FIG. 2). That message includes the policy document carried by the agent.

The policy handler class includes an XML parser (such as the Xerxes parser) which takes the policy supplied by the agent and converts into a Document Object Model—this gives the class access to the values of the fields of the policy document. The policy handler interprets the condition part of the policy and then evaluates the condition.

To do this for a hardware or software condition, it triggers a resource daemon program present on the computer to run. The resource daemon program can return the current value of a parameter requested by the policy handler class. The policy handler then replaces the parameter name in the condition with the value received from the resource daemon. For a condition which involves metadata about data already stored on the computer, code for extracting the relevant data from the data store is accessed by the policy handler and run. It then evaluates the condition—if the condition is met, it can retrieve the file and store it at the current computer. If the test is failed, this could be indicated to the agent, which could respond by migrating to a neighbouring computer.

Figure 13:
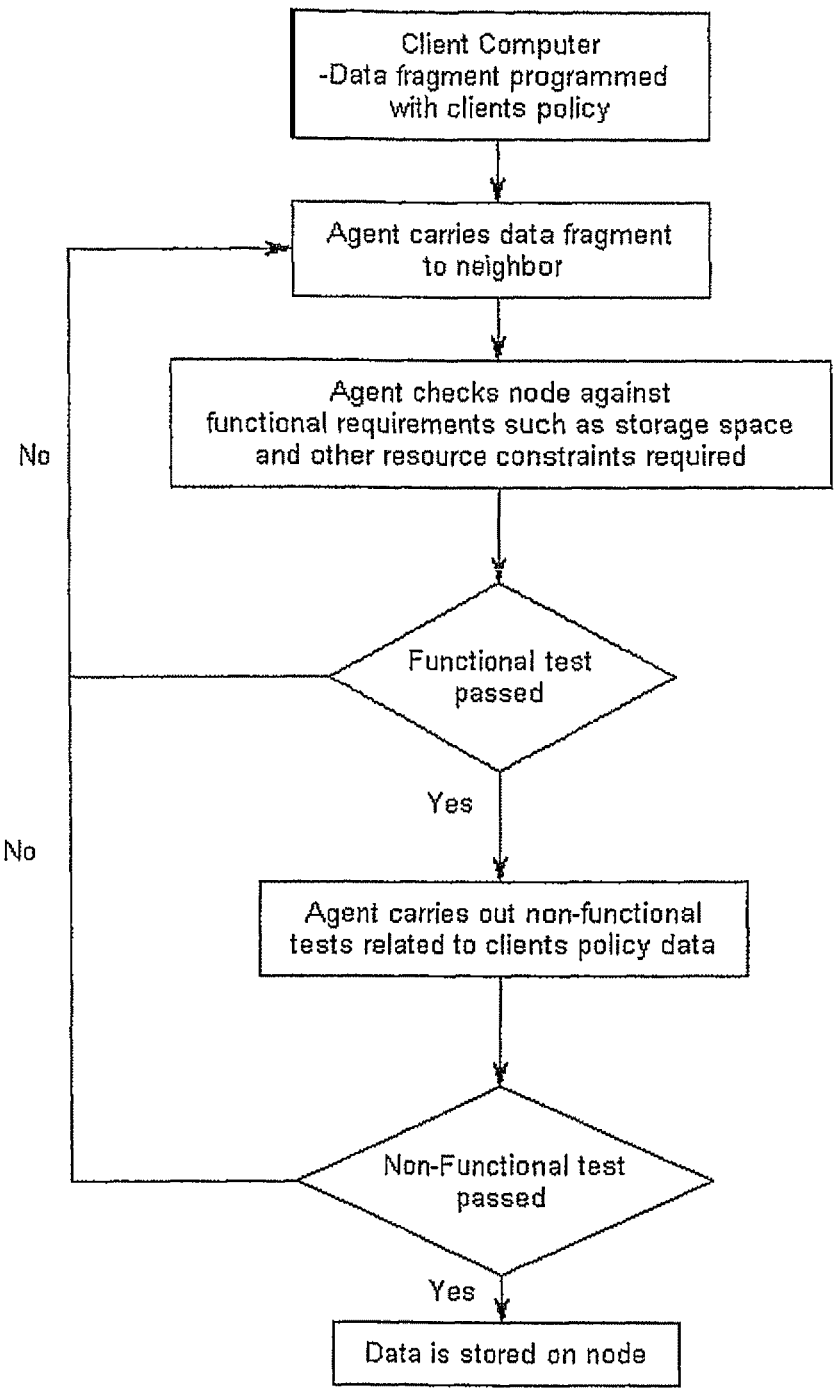
FIG. 13 is a flow-chart showing the processes carried out by the agent on arrival at a node in more detail.

FIG. 13 shows how the test could include functional test requirements (e.g. that there is sufficient storage space available at the node, or that the communication delay to a specified node falls below a threshold amount) and/or non-functional test requirements. The extensibility of the policy document DTD means that a huge variety of tests could be carried out in dependence upon the datacheck and UserDefinedCheck fields of the policy carried by the agent.

The flexibility of using policies in this way can be seen by considering some of the results which might be achieved using policies in the way described above:

Disaster Recovery & Resilience—In a decentralised file storage system as described above there is a need to avoid storing more than one fragment of a given file on the same computer. This can be achieved using a policy which only allows storage of no fragments of the file already present on the computer.

Aggregation—using metadata associated with files previously stored at a computer, files representing the same or related content can be stored together. For example, an agent carrying a file representing an advert for a music product could be provided with a policy requiring that it be stored where a large number of music files is found on a computer.

It will be seen how the policy-related embodiment of the present invention allows a client to specify the different needs of different applications or even of different instances of the same application. Through this approach of applying policy-based management, a change to the policy will enable the client to distribute requirements with his data.

In a further embodiment, the client builds up a profile (user profile) or selects information to be included as additional information to be carried by the agent (building up the user profile could be done by daemon running on a clients computer). This profile is then included with the agent (in addition to the required information needed by the agent to aid the agent in deciding where to place data). Consequent agents and policies arriving within that environment can query this data to make an informed choice as to whether a file should be stored at the node.

What is claimed is:

1. A distributed storage network comprising a plurality of interconnected computers, said computers including a plurality of host computers, each having a store for data items, and at least one client computer, wherein said client computer stores client code comprising:
   a) storage initiation code executable to initiate storage of a data item in one or more of said plurality of host computers' stores;
   b) storage condition generation code executable to generate one or more interpretable storage conditions which must be met by a candidate host computer store in order for said candidate host computer store to store said data item, said interpretable storage conditions indicating a required value of one or more time-varying storage characteristics;
   c) storage condition sending code executable to send said one or more interpretable storage conditions to one or more of said plurality of host computers;
   wherein each of said host computers stores host code including:
   d) storage condition reception code executable to receive said one or more interpretable storage conditions from another of said plurality of host computers;
   e) host computer store characteristic provision code executable to provide host storage characteristic data indicating the value of one or more time-varying characteristics of said host computer's stores;
   f) storage condition interpreter code executable to interpret said one or more interpretable storage conditions in the light of said host storage characteristic data provided by said host computer and thereby to establish whether said host computer's store meets said storage conditions;
   g) data item storage code executable to store said data item in said host computer's store on the execution of said condition interpreter code finding that said host computer meets said storage conditions; and
   h) storage condition forwarding code executable, on the execution of said condition interpreter code finding that said host computer's store does not meet said storage conditions, to forward said storage conditions to another of said plurality of host computers.

2. A distributed storage network according to claim 1 in which at least one of said plurality of interconnected computers stores both said client code and said host code.

3. A distributed storage network according to claim 1 in which said one or more interpretable storage conditions are persistently stored at one or more of said plurality of interconnected computers.

4. A distributed storage network according to claim 3 wherein said persistent storage is provided by a database stored at each of said at least one or more computers providing persistent storage of said interpretable storage conditions.

5. A distributed storage network according to claim 3 in which said one or more of said plurality of interconnected computers further stores storage condition editor code executable to provide a user with an interface enabling the user to update said interpretable storage conditions or to record new interpretable storage conditions.

6. A distributed storage network according to claim 5 in which said client computer further stores said storage condition editor code.

7. A distributed storage network according to claim 1 in which said storage condition interpreter code interprets said one or more interpretable storage conditions using schema data which indicates a common structure for said interpretable storage conditions.

8. A distributed storage network according to claim 1 in which said interpretable storage conditions form a component of a rules data structure which further includes action data indicating actions to be carried out by one of said plurality of host computers on the store of said one of said plurality of host computers meeting said one or more interpretable storage conditions.

9. A distributed storage network according to claim 8 in which said rules data structure forms a component of a policy data structure which further includes event data indicating one or more events which must take place in order to trigger the execution of said storage condition interpreter code.

10. A distributed storage network according to claim 1 in which said host storage characteristic data include stored data item description data which describes data items already stored in said host computer store.

11. A distributed storage network according to claim 1 in which said plurality of interconnected computers comprise computers having differing hardware architectures and operating system programs stored thereon, each of said plurality of interconnected computers further storing common machine emulation code executable to translate code executable on said common machine to code executable on the hardware architecture and operating system of the interconnected computer on which the emulation code is executed.

12. A method of operating a network of interconnected computers, said interconnected computers including a plurality of host computers, each host computer having a store for data items, and a least one client computer, said method including:
   operating said client computer to:
   a) initiate storage of a data item in one or more of said host computer stores; and
   b) generate one or more interpretable storage conditions indicating a required value of one or more time-varyinq characteristics of host computer stores which must be met by a candidate host computer store in order for said candidate host computer store to store said data item;
   c) send said one or more interpretable storage conditions to one or more of said host computers;
   operating each of said plurality of host computers to:
   d) receive said one or more interpretable storage conditions from another of said plurality of host computers;
   e) provide host storage characteristic data indicating the value of one or more time-varying characteristics of said host computer's store;
   f) interpret said one or more interpretable storage conditions in the light of said host storage characteristic data provided by said host computer store and thereby to establish whether said host computer's store meets said storage conditions;
   g) store said data item in said host computer's store on finding that said host computer's store meets said storage conditions; and
   h) forward said storage conditions to another of said plurality of host computers on finding that said host computer's store does not meet said storage conditions.

13. A non-transitory computer readable storage medium storing code executable by at least one computer processor to carry out the method steps of claim 12.

14. A host computer configured to be part of a distributed storage network comprising a plurality of interconnected computers including a plurality of host computers, said plurality of host computers including said specific host computer, each of said plurality of host computers having a store for data items, and at least one client computer storing client code including storage initiation code executable to initiate storage of a data item in one or more of said plurality of host computers' stores and storage condition generation code executable to generate one or more interpretable storage conditions indicating a required value of one or more time-varying characteristics which must be met by a candidate host computer store in order for said candidate host computer store to store said data item, said specific host computer storing host code including:
   a) storage condition reception code executable to receive said one or more interpretable storage conditions from another of said plurality of host computers;
   b) host computer storage characteristic provision code executable to provide host storage characteristic data indicating the value of one or more time-varying characteristics of said specific host computer's store;
   c) storage condition interpreter code executable to interpret said one or more interpretable storage conditions in the light of said host storage characteristic data provided by said specific host computer and thereby to establish whether said specific host computer's store meets said storage conditions;
   d) data item storage code executable to store said data item in said specific host computer's store on the execution of said condition interpreter code finding that said specific host computer's store meets said storage conditions; and
   e) storage condition forwarding code executable, on the execution of said storage condition interpreter code finding that said specific host computer's store does not meet said storage conditions, to forward said storage conditions to another of said plurality of host computers.

15. A method of operating a specific host computer configured to be part of a distributed storage network comprising a plurality of interconnected computers including a plurality of host computers, each having a data store for data items, and at least one client computer storing client code including storage initiation code executable to initiate storage of a data item in one or more of said stores and storage condition generation code executable to generate one or more interpretable storage condition indicating a required value of time-varying characteristics of host computer's stores suitable for storing said data item, said method comprising operating said specific host computer to:
   a) receive said one or more interpretable storage conditions from another of said plurality of host computers;
   b) provide host storage characteristic data indicating the value of one or more time-varying characteristics of said specific host computer's stores;
   c) interpret said one or more interpretable storage conditions in the light of said host storage characteristic data provided by said host computer and thereby to establish whether said specific host computer's store meets said storage conditions;

d) store said data item in said specific host computer on said interpretation of said storage conditions finding that said specific host computer's store meets said storage conditions; and e) forward said storage conditions to another of said plurality of host computers, on said interpretation of said storage conditions finding that said specific host computer's store does not meet said storage conditions.

16. A distributed storage network as in claim 1 wherein the data item is forwarded with the storage condition in step h).

17. A method as in claim 12 wherein the data item is forwarded with the storage condition in step h).

18. A host computer as in claim 14 wherein the data item is forwarded with said storage condition in step e).

19. A method as in claim 15 wherein the storage condition is forwarded with said data item in step e).

20. A non-transitory computer-readable storage medium storing code executable by at least one computer processor to carry out the method of claim 14.

* * * * *

UNITED STATES PATENT AND TRADEMARK OFFICE
CERTIFICATE OF CORRECTION

PATENT NO. : 8,463,867 B2  Page 1 of 1
APPLICATION NO. : 10/541061
DATED : June 11, 2013
INVENTOR(S) : Robertson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 652 days.

Signed and Sealed this
Eighth Day of September, 2015

Michelle K. Lee
*Director of the United States Patent and Trademark Office*